(12) United States Patent
Swanson et al.

(10) Patent No.: US 6,594,714 B1
(45) Date of Patent: Jul. 15, 2003

(54) RECONFIGURABLE FIFO INTERFACE TO SUPPORT MULTIPLE CHANNELS IN BUNDLED AGENT CONFIGURATIONS

(75) Inventors: Jeffrey C. Swanson, Sunnyvale, CA (US); Debendra Das Sharma, Santa Clara, CA (US); Jason Jones, Oxnard, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,953

(22) Filed: May 1, 2000

(51) Int. Cl.[7] ................................................ G06F 3/00
(52) U.S. Cl. .............................. 710/51; 710/38; 710/36
(58) Field of Search ................................. 710/1, 36, 70, 710/128, 38, 51; 711/127; 714/738; 370/200

(56) References Cited

U.S. PATENT DOCUMENTS

| | | | | |
|---|---|---|---|---|
| 4,558,433 A | * | 12/1985 | Bernstein ................ | 365/189.02 |
| 6,175,910 B1 | * | 1/2001 | Pauporte et al. ............ | 712/217 |
| 6,219,756 B1 | * | 4/2001 | Kasamizugami ....... | 365/189.02 |
| 6,430,626 B1 | * | 8/2002 | Witkowski et al. ......... | 709/249 |
| 6,442,724 B1 | * | 8/2002 | Augarten ..................... | 714/738 |

* cited by examiner

Primary Examiner—Jeffrey Gaffin
Assistant Examiner—Niketa Patel (57) ABSTRACT

A reconfigurable register array structure allows an agent to transmit data from a single channel or in bundled form from multiple channels. The structure makes economical use of valuable chip space by reducing the size of the overall register array system. A coalescing prestage is used to collect data from single channels or from multiple channels and to multiplex the data, based on a priority scheme, to supply the data to a primary stage of first-in-first-out register arrays. The coalescing prestage may include one or more first registers, a delay register, multiplexers to select outputs of the first registers, and multiplexers to select outputs of the delay register. Alternatively, the coalescing prestage may include one or more register array structures, each such structure having independent write ports, one for each channel. Data coalesced in the coalescing prestage is provided to a primary stage. The primary stage may include one or more logical register arrays configured as one physical array. Separate write pointers may be used to ensure data from a particular channel is provided to the correct location in the physical array.

20 Claims, 6 Drawing Sheets

RECONFIGURABLE FIFO INTERFACE TO SUPPORT MULTIPLE CHANNELS IN BUNDLED AGENT CONFIGURATIONS

TECHNICAL FIELD

The technical field is data systems that support multiple agents.

BACKGROUND

Current computer architectures may have a single microprocessor or chip that services data to multiple agents. Each agent may be allocated one or more physical channels or ports to handle the data flow. A common requirement of this design may be that the host chip maintain bandwidth requirements for all the agents in parallel. Another requirement is that data from a first agent must travel in order such that the data arriving at a point at which the first agent merges with other agents is in the same order as when the data left the first agent. In other words, data out of an agent must be provided in the same order as the data are received, even if the data are spread across multiple channels. Yet another requirement may be that two or more physical channels may be configurable as two separate logical agents, or grouped into one logical agent. The ability to group multiple channels into one agent is called bundling.

For single-channel agents, a common computer architecture provides dedicated first in/first out (FIFO) register arrays for each channel and to then multiplex the final output in whatever arbitrated fashion is desired. The circuit that supports the dedicated FEFOs must have an output bandwidth that is greater than or equal to the sum of incoming bandwidths from the channels. For example, in an architecture with four channels, each 8-bits wide, the FIFOs in the final multiplexing stage must be at least 32 bits wide to maintain the bandwidth at the same clock frequency. If frequencies differ, the same bandwidth rule applies, but the bit width may not be the sum of the channels.

Chip area considerations drive chip designers to find ways to economize area demands by reducing as much as possible the number of discrete components on the chip. In a case where two or more physical channels are maintained as one logical agent, chip area can be conserved feeding all data through a particular agent's FIFO for all physical channels bundled to that agent. The main disadvantage of this structure is that a single channel agent configuration has unnecessarily deep FEFOs for some agents, resulting in larger chip area and, therefore, a higher cost of the chip. Moreover, the multiple agent configuration does not use all the FIFOs resulting in larger chip area and cost.

SUMMARY

A reconfigurable register array structure allows data transmission from a single agent or in bundled form from multiple agents. The structure makes economical use of valuable chip space by reducing the size of the overall register array system. A coalescing prestage is used to collect data from single agents or from multiple agents and to multiplex the data, based on a priority scheme, to supply the data to a primary stage of first-in-first-out register arrays. The coalescing prestage may include one or more first registers, a delay register, and multiplexers to select outputs of the first registers.

In an alternative embodiment, the coalescing prestage may include one or more register array structures, each such structure having independent write ports, an independent write port for each agent or channel. The structure also has individual read ports. Data coalesced in the coalescing prestage is provided to the primary stage. The primary stage may include one or more logical register arrays configured on a physical array. Separate write pointers may be used to ensure data from a particular channel is provided to the correct location in the physical array.

DESCRIPTION OF THE DRAWINGS

The detailed description will refer to the following figures, in which like numerals refer to like objects, and in which.

DETAILED DESCRIPTION

Figure 1:
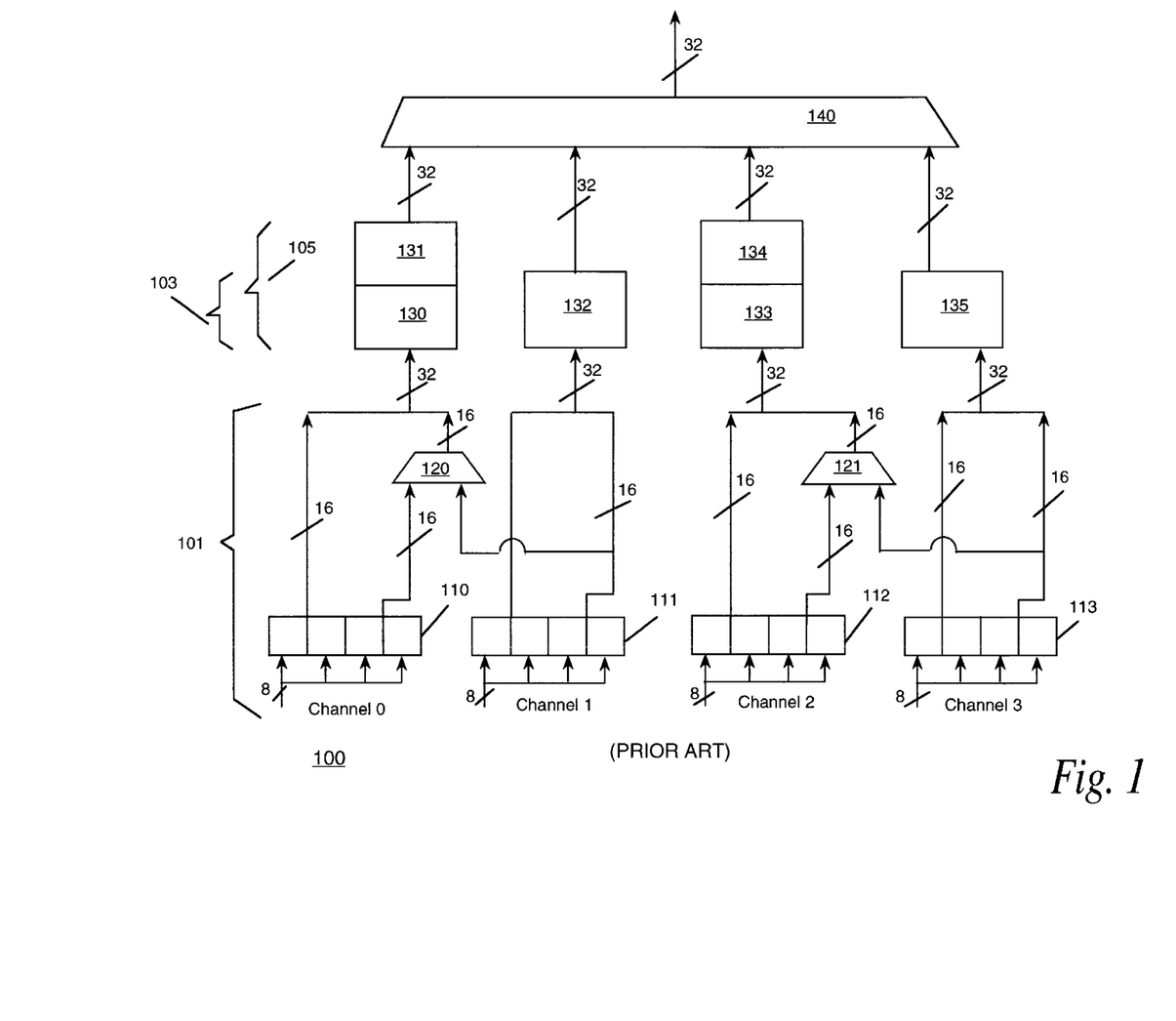
FIG. 1 is an example of a prior art architecture.

Chip designers attempt to minimize area demands on a chip by reducing to the extent possible the number of discrete components required on the chip. In computer architectures, such a chip may service data to multiple agents. Each agent may be allocated one or more physical channels or ports to handle the data flow. A common requirement of this design is that the chip maintain bandwidth requirements for all of the agents in parallel. FIG. 1 illustrates an architecture that provides dedicated first in/first out (FIFO) register arrays for each channel and then multiplexes the final output in an arbitrated fashion. The architecture 100 includes a coalescing prestage 101 and register array stages 103 and 105. The register array stage 103 is used for a single channel agent and indicates a FIFO depth of one channel. The register array stage 105 is for a double channel agent and indicates a FIFO depth of two channels. The architecture 100 is shown with four channels, namely channel 0–channel 3. Each of the channels provides 8 bits of data per cycle to one of a 32-bit register 110–113. As described herein, a register is a 1×N-wide data storage device. The registers 110–113 are shown as 1×32 bit-wide storage devices. As shown in FIG. 1, four clock cycles are required to load one of the registers 110–113 with 8 bits of data per cycle supplied on the channels 0–3.

An output of the register 110 and the register 111 may be provided to multiplexer 120. Similarly an output of the register 112 and the register 113 may be provided to a multiplexer 121. The output of the multiplexer 120, and remaining outputs of the registers 110 and 111 may be provided to the FIFO register arrays 130/131 and 132, respectively. Similarly, outputs of the registers 112 and 113 and the multiplexer 121 may be provided to the FIFO register arrays 133/134 and 135, respectively. In the architecture shown in FIG. 1; each of the FIFO register arrays 130/131, 132, 133/134 and 135 have one write port. Each of the FIFO register arrays 130/131, 132, 133/134 and 135 are configured to hold a specific number of 1×N-wide entries. For example, the FIFO register array 130/131 may hold at least 32 such entries. Since data can only be loaded into the FIFO register arrays 130/131, 132, 133/134 and 135 in 32-bit-wide quantities, four cycles of 8-bit data must be coalesced in the coalescing stage 101 for a given channel and then loaded into the agent's logical FIFO register array.

Under some conditions, two or more physical channels may be maintained as one logical agent. To accommodate this configuration, the register array may be increased by the multiple of the number of physical channels the register array is intended to handle to maintain the required bandwidth. For example, channel 0 and channel 1 may be bundled together as one logical agent and provided to the FIFO register array 130/131. In this case, the depth of the FIFO register array 130/131 is double the depth to just service a single channel such as the channel 0.

When two or more physical channels are bundled together as one logical agent, the coalescing prestage 101 must also coalesce the data from two or more physical channels until enough data bits are collected to load one entry into the register array, such as the FIFO register array 130/131. For example, if channel 0 and 1 are bundled together to service agent 0, 16 bits of data are received each cycle into the coalescing prestage 101 and two cycles are required until all of the data is loaded into the FIFO register array 130/131 (16 bits from channel 0 and 16 bits from channel 1). The outputs of the FIFO register arrays 130/131, 132, 133/134, and 135 are then fed to multiplexer 140 as 32-bit outputs.

The main disadvantage of this architecture 100 is that the single channel agent configuration has unnecessarily deep FIFOs for some agents, resulting in a larger chip area requirement and therefore a higher cost to manufacture the chip. In addition, the multiple agent configuration does not use all of the FIFO register arrays (only one FIFO out of n channels is used), which is inefficient.

Figure 2:
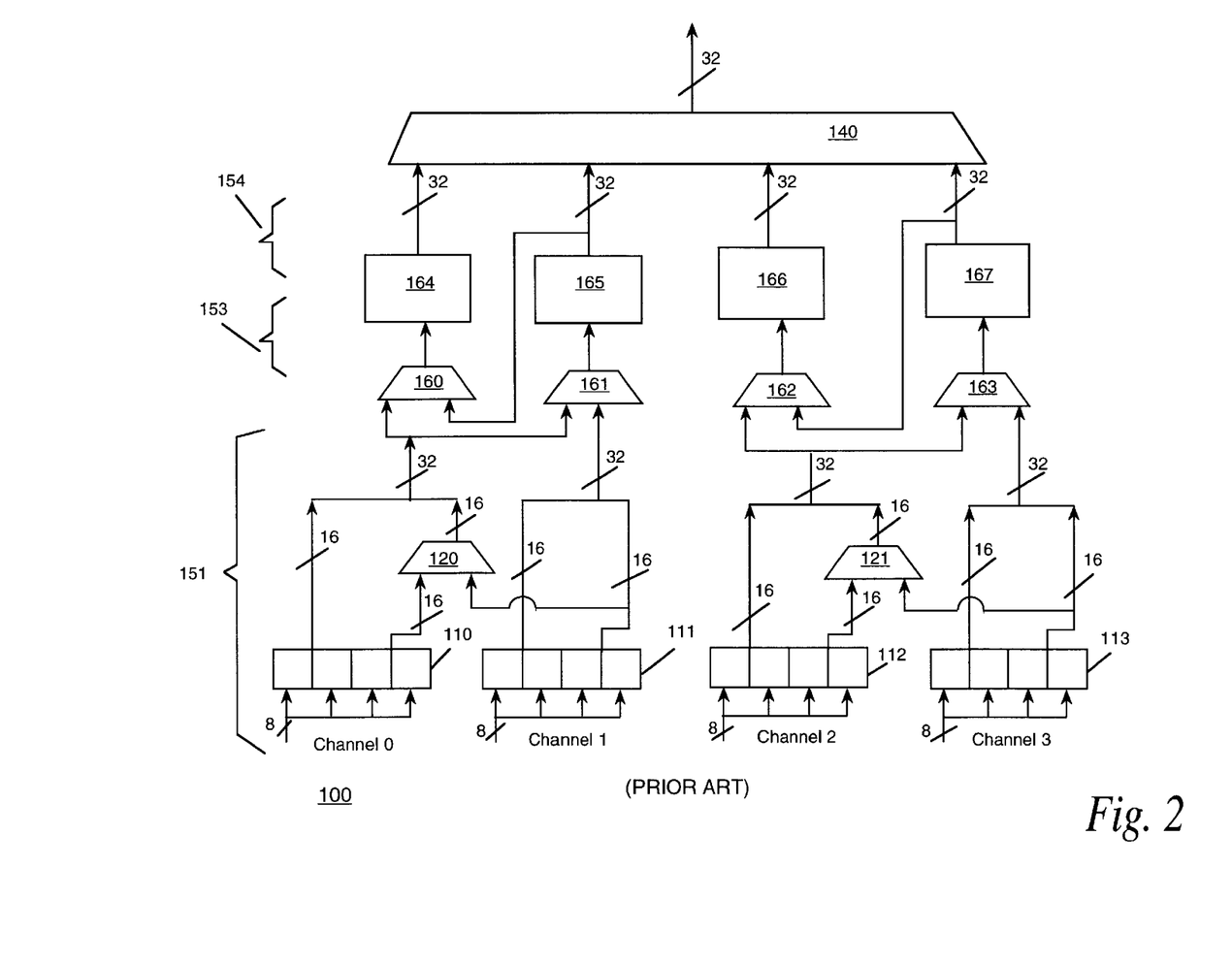
FIG. 2 is another example of a prior art architecture.

FIG. 2 illustrates a prior art solution to FIFO under utilization. In FIG. 2, a computer architecture 150 daisy chains the FIFOs according to a required degree of bundling. The architecture 150 provides each logical agent with a FIFO depth of two channels. The architecture 150 is similar to the architecture 100 shown in FIG. 1 except that a stage 153 of multiplexers is added between a coalescing prestage 151 and a FIFO stage 154. The multiplexer stage 153 includes the multiplexers 160–163. The output of each multiplexer is provided to a FIFO register array. In particular, the output of the multiplexer 160 is fed to a single channel depth FIFO register array 164, the output of the multiplexer 161 is fed to a single channel depth FIFO register array 165, the output of the multiplexer 162 is provided to single channel depth FIFO register array 166 and the output of the multiplexer 163 is provided to the single channel depth FIFO register array 167. Each of the FIFO register arrays 164–167 are provided with one write port and read port.

The architecture 150 overcomes some of the limitations of the architecture 100 shown in FIG. 1. In particular, the architecture 150 eliminates the need for stacking FIFO register arrays to achieve the required double channel depth to accommodate bundled channels. The extra depth is eliminated because, for example, the architecture 150 uses channel 1's FIFO register array 165 daisy chained with channel 0's FIFO 164 to achieve the same double depth provided by the FIFO register array 130/131 shown in FIG. 1. That is, the output of the FIFO register array 165 is provided to the input of the FIFO register array 164, through the multiplexer 160, to achieve the equivalent depth of two channels. In operation, the FIFO register array 164, being fed by channel 0, is loaded with data. Once the FIFO register array 164 is filled, channel 0 may continue to provide data to the FIFO register array 165. Then, once data begins to be read from the FIFO register array 164, data may be output or read from the FIFO register array 165 and provided to the input or write port of the FIFO register array 164. In effect, the FIFO register arrays 164 and 165 are now daisy chained to provide a virtual FIFO register array that is two channels deep.

While the architecture 150 shown in FIG. 2 is an improvement over the architecture 100 shown in FIG. 1, the architecture 150 introduces another set of problems. In particular, the architecture 150 does not effectively utilize the FIFO storage space. This problem is due to the fact that the FIFO register arrays with read and write pointers tend to have lower densities as the array depth decreases. In other words, the data input buffering/logic, data output/logic, the read pointer and the write pointer logic become a larger percentage of the overall area of the register array as the register array depth decreases. The architecture 150, which eliminates some waste of FIFO space, still requires one register array per physical channel, with the result of inefficient utilization of FIFO storage space.

To overcome the problems of FIFO underutilization and FIFO density optimization, an architecture efficiently controls when and where data is stored in the available FIFO space. The architecture balances tradeoffs in semiconductor characteristics in order to obtain an optimal area and speed circuit for a host chip servicing multiple channels in configurable agent bundles. When bundling agents or channels, the architecture does not require increasing the register array-based FIFO. The architecture can combine all register arrays into one or more efficiently dense register arrays. The architecture also results in fewer ports in the final stage-wide multiplexer.

Figure 3:
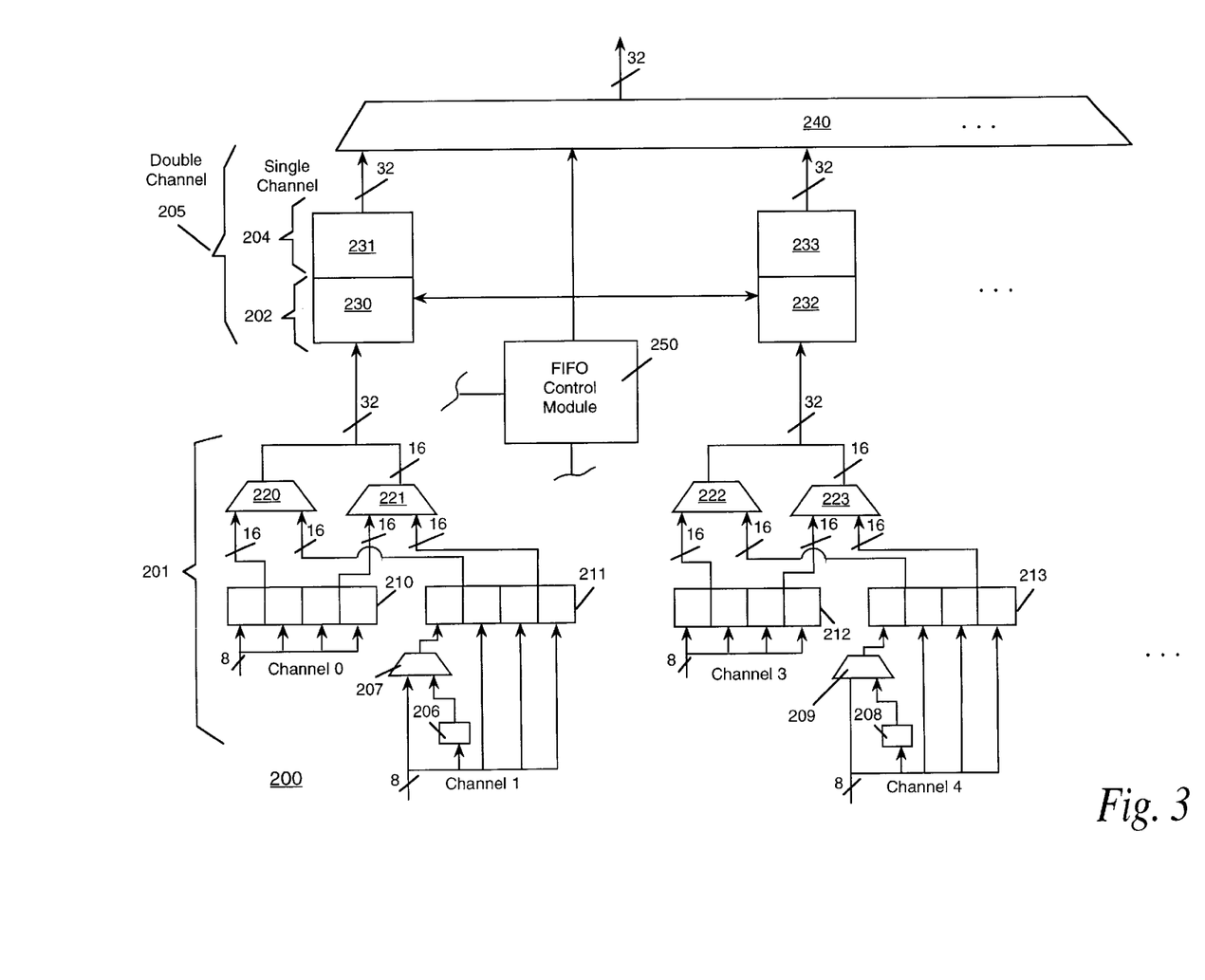
FIG. 3 illustrates a architecture that minimizes chip area.

FIG. 3 illustrates an improved architecture 200 that overcomes the problems inherent in the architectures 100 and 150 shown in FIGS. 1 and 2, respectively. The architecture 200 includes a coalescing prestage 201, FIFO stages 202/204 (single channel bundling) and 205 (double channel bundling) (or similar storage devices), and a final multiplexing stage using multiplexer 240. The architecture 200 in FIG. 3 is shown with four channels 0–3. However, the architecture 200 may accommodate any number of channels. Also as shown in FIG. 3, and as will be described in detail later, channels 0 and 1 may be bundled and channels 2 and 3 may be bundled. However, the concepts embodied in the architecture 200 are not limited to bundling two channels. Any number of channels may be bundled together using the concepts illustrated in FIG. 3.

The coalescing prestage 201 includes registers 210–213 and 206 and 208. Outputs of the registers 206 (channel 1) and 208 (channel 3) are provided to delay multiplexers 207 and 209, respectively. Outputs of the registers 210 and 211 are provided to multiplexers 220 and 221. Outputs of the registers 212 and 213 are provided to the multiplexers 222 and 223.

The registers 210 and 211 are shown as 32-bits wide. That is, the registers 210 and 211 will fill up to 32 bits, and then will empty. In an embodiment, the register 210 may be only 24 bits-wide, and in operation, the last 8 data bits from channel 0 may bypass the register 210 and pass directly to the multiplexer 220.

Register arrays 230/231 and 232/233 receive outputs from the multiplexer pairs 220/221 and 222/223, respectively. The register arrays 230/231 and 232/233 physically may be 32-entry arrays, with each entry 1×N-bits-wide. The register arrays 230/231 and 232/233 may then be divided logically into two register arrays with entry addresses 0–15 for logical register arrays 230 and 232, and entry addresses 16–31 for logical register arrays 231 and 233. Finally, the register arrays 230/231 and 232/233 provide outputs to the multiplexer 240.

The register arrays 230/231 and 232/233 may have an input bus capacity, taking into account a bandwidth and a clock frequency of the input bus, that is equal to or greater than the total bandwidth of the bundled channels.

The register arrays 230/231 and 232/233 and the multiplexers 207,209,220–223 and 240 are connected to (for clarity, not all connections are shown) and operate under control of a reconfigurable FIFO control module 250. The module 250 includes the necessary programming to operate the multiplexers 207,209,220–223 and 240 and read and write pointers in the register arrays 230/231 and 232/233. That is, the module 250 may function to operate components of the architecture 200 to support single channel bundling and multiple channel bundling. The operation of the module 250 will be explained in detail later.

In the discussion that follows, components of the architecture 200 related to channel 0 and 1 will be described in detail. Components of the architecture 200 related to the channels 2 and 3 should be understood to be similarly constructed and to operate in the same manner.

Double channel bundling occurs when channels, such as channels 0 and 1, are bundled to service a single agent, such as agent 0. In this case, the module 250 controls the multiplexers 207 and 220 and 221 and the FIFO register array 230/231 to operate in the double channel-bundled configuration. In particular, during each of two clock cycles, the registers 210 and 211 store eight bits of data, so that a total of 32 data bits are stored. The multiplexer 207 and the register 206 operate to pass the data bits to the register 211 with no delay. When 32 data bits are loaded, the registers 210 and 211 output their data to the multiplexer 220, and the data bits are written to the next available entry in the FIFO stage 205 (single FIFO register array 230/231).

Single channel bundling presents two possible problems that are overcome by the architecture 200. First, data may arrive at the registers 210 and 211 during the same clock cycles. In the worst case situation, both channels 0 and 1 prestages (registers 210 and 211) fill in the same cycle. Since only one of the prestages can be loaded into the single physical FIFO register array 230/231 in a given cycle, channel 0 will be loaded and channel 1's prestage register 211 is stalled for one cycle. To overcome this problem, a delay feature is added to the architecture 200 by using the register 206. The second problem is that separate FIFO register arrays would normally be needed to store data from the single channels 0 and 1. To minimize chip space devoted to FIFOs, the FIFO register array 230/231 is shared between agents 0 and 1.

In a single channel agent configuration, for example where channel 0 and channel 1 each represent separate agents, the coalescing prestage coalesces 32-bits of information into the register 210 for channel 0. For channel 1, 32-bits of information are coalesced into the register 211. However, for channel 1, the second prestage register 206, capable of holding 8 bits of data, is used to impose a one cycle delay on some of the data loading into the register 211. Since channel 0 may always be given priority, the register 210 will be unloaded first should the registers 210 and 211 both reach their 32-bit capacity. In more detail, channel 0 loads 8-bits per cycle until 32-bits are coalesced into the register 210, and then always has priority to immediately load into the primary FIFO stage to its allocated register array space. Channel 1 loads 8-bits per cycle, the first 8-bits traveling through the delay register 206 before entering into register 211, the second, third and fourth 8-bits of channel 1 going directly into register 211. Upon collecting a complete 32-bits into the register 211, channel 1 can be stalled for one cycle if it completes loading coincident with the register 210, in which case a subsequent 8-bits for channel 1 is loaded into the delay register 206 until the next cycle when the register 211 can now be loaded into its primary FIFO space. At the same time that the register 211 advances to the primary FIFO space, the delay register 206 will advance to the register 211. Alternate mechanisms may also be used to impose a delay.

In general, the delay register 206 need only be as wide as the maximum latency before the first stage is loaded into the FIFO register array 230/231. In this case, the delay register 206 is 8-bits wide. Alternatively, if more than two channels were bundled together, latency would be greater and the size of the delay register 206 would be expanded to accommodate this configuration. For example, if four channels were bundled together, the maximum latency would be three cycles for channel 3 requiring channel 3 to have three 8-bit registers for prestorage or delay.

To further accommodate the single bundle case of separate agents, separate logical write pointers are provided in each of the logical FIFO stages 203 and 204, even though the physical FIFO register arrays 230 and 231 share the same physical register array storage, which has only one write port. In other words, different portions of the FIFO register array 230/231 are allocated for each of the agents 0 and 1. These allocations may be fixed, and evenly divided keeping the pointer logic less complex. In an alternative embodiment, non-equal, non-fixed allocation of the register array may be implemented. When channel 0 writes to the FIFO register array 230/231 with 32-bits coalesced, a write pointer for agent 0 is passed to an actual (physical) write pointer port for the FIFO register array 230/231, loading the data into the first physical entry allocated to agent 0 (e.g., physical entry 0). When channel 1 receives 32-bits of data, a write pointer for agent 1 is passed to an actual (physical) write pointer of the FIFO register array 230/231, loading data into a first physical entry allocated to agent 1 (e.g., physical entry n/2, where n represents the number of entries in the FIFO register array 230/231). The mechanism for ensuring agent 1's data are always written to the desired entries in the FIFO register array 230/231 will be described in detail later. A similar implementation is completed for the read pointer. No demultiplexing or post-stage registers are required because the FIFO register array 230/231 is already set with the correct bandwidth to match internal busing. However, if the final internal bus were wider than the total width of all the physical channels served by the register array 230/231, then either the prestage registers could be designed to be wider or post-FIFO registers could be added to coalesce data in much the same manner as the prestage registers function.

The architecture 200 does not waste any FIFO register array space and results in much greater efficiencies through increased register array density by collapsing two separate FIFOs into one. The only additional requirement is extra write and read pointers and extra register second prestage and multiplexers in the coalescing prestage 201.

The architecture 200 shown in FIG. 3 provides much improved FIFO utilization compared to the architectures 100 and 150 shown in FIGS. 1 and 2, respectively. However the architecture 200 presumes that efficiencies gained in using deeper FIFO register arrays outweigh the increased area from added coalescing prestage components.

Figure 4:
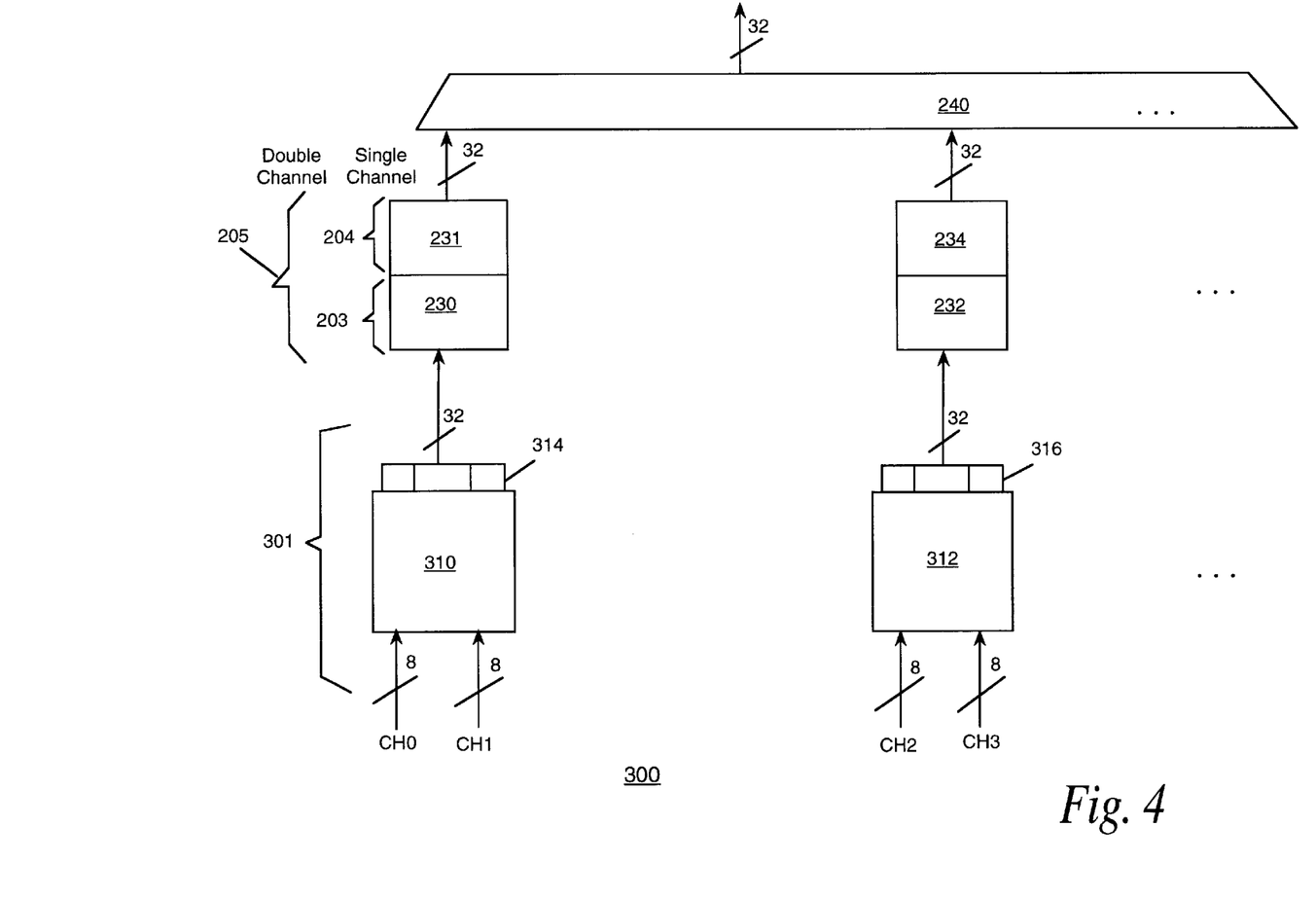
FIG. 4 illustrates another architecture that minimizes chip area.

FIG. 4 shows a computer architecture 300 that provides the same primary FIFO stage efficiencies as the architecture 200 shown in FIG. 3 but eliminates the need for additional components in the coalescing prestage. That is, either a single channel primary FIFO stage 203 or a double channel primary FIFO stage 205 is used with bundled FIFO register arrays 230/231 and 232/234 supplying multiplexer 240 in a final output stage.

The architecture 300 includes a coalescing prestage 301 having multi-ported register arrays 310 and 312. The register array 310 services channels 0 and 1 and the register array 312 services channels 2 and 3. Each of the register arrays 310 and 312 provide two write ports, each 8-bits wide. The depth of the register array 310 is equal to the sum of the 8-bit entries. Each physical channel (0–3) is allocated its own write port independent of the bundling configuration. Also, depending on the bundling configuration, agents 0 and 1 either have independent write and read pointers that coalesce the data in the coalescing prestage 301 (for single channel bundling) or agent 0 controls both the write pointers as well as the read pointers (for double channel bundling). In a single bundle configuration, the register array 310 comprises two physical regions, four 8-bit entries for agent 0 and five 8-bit entries for agent 1. The same configuration applies to the register array 312. Also included in the coalescing prestage 301, for each of the register arrays 310 and 312, is a four read port configuration 314 and 316, respectively. Each of the four read ports is 8-bits wide. Thus, 32-bits may be read from the prestage and written to the FIFO register array 230/231 in one cycle.

As before, the architecture 300 can be extended to any number of source channel and bundling requirements and to any ratio of incoming channel data width to internal bus width. In an embodiment, the internal bus width is a minimum multiple of two of the incoming data. In an alternative embodiment, individual channel bandwidths are variable. However, the internal bus width is equal to or greater than the bundled channel bandwidth.

Figure 5:
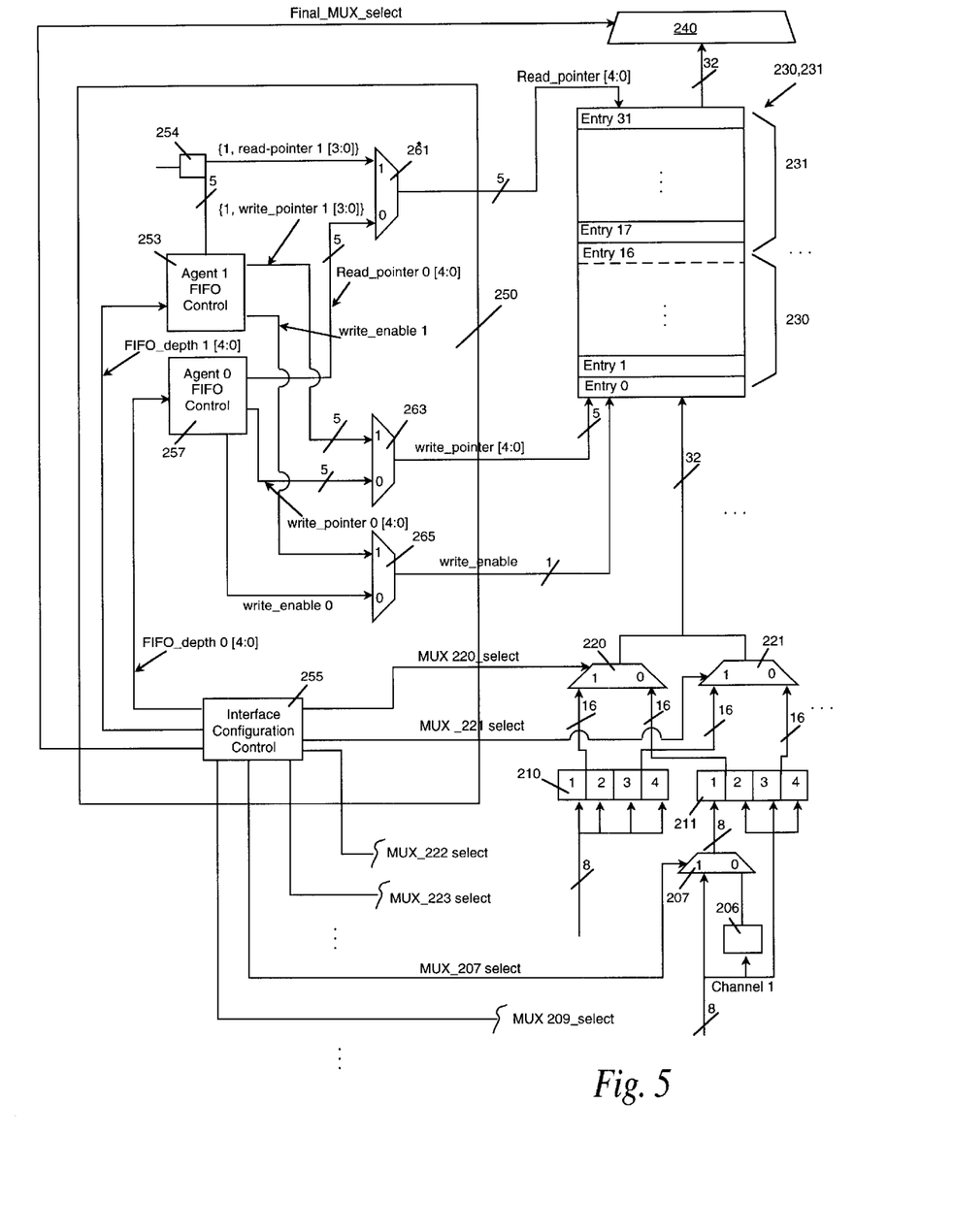
FIG. 5 illustrates a reconfigurable FIFO control module used with the architecture of FIG. 3.

FIG. 5 shows the reconfigurable FIFO configuration control module 250 and its connections to the architecture 200 in more detail. The module 250 includes software and hardware to control the configuration of the register arrays 230/231 and 232/233 shown in FIG. 3, as well as the multiplexers that control data flow in the architecture 200. A similar control module may be used with the architecture 300 shown in FIG. 4.

The operation of the FIFO configuration control 250 achieves three objectives. First, separate, independent FIFO controls are provided for each agent in the architecture serviced by the control 250. Second, one FIFO control mechanism can be used for different channel bundling configurations. Third, logic is provided to map logical FIFO space to actual, physical FIFO space.

Returning to FIG. 5, the module 250 includes agent 0 FIFO control 251 and agent 1 FIFO control 253. The controls 251 and 253 operate independently of each other. Similar controls (not shown) are provided for the agents related to the FIFO register array 232/233. Also included in the module 250 is an interface configuration control 255. Outputs of the controls 251 and 253 are provided to read pointer multiplexer 261, write pointer multiplexer 263 and write enable multiplexer 265. The multiplexers 261, 263 and 265 receive control signals from the control 255.

The control 255 provides a fifo_depth 0 [4:0] signal to the control 251 and a fifo_depth 1 [4:0] signal to the control 253 to indicate the required depth of the FIFO register array. The controls 251 and 253 provide write pointer, write enable, and read pointer signals to the multiplexers 261, 263 and 265. To provide control for a 32-entry FIFO register array, the signals are five bits [4:0]. Five bit signals are required because agent 0 data may be written to entries 0–15 and agent 1 data may be written to entries 16–31. To constrain agent 1 to write only to entries 16–31 (and to have data read from these entries), a node 254 (or similar device) between the agent 1 FIFO control 253 and the multiplexer 261 may be used to insert a value of 1 for the most significant encoded pointer bit (in this case bit [4]). A corresponding wire from the agent 1 FIFO control 253 is then terminated. As a result, any data for agent 1 written to, or read from, the FIFO register array 230/231 will always be to or from one of the entries 16–31. In this embodiment, the fifo_depth 1 [4:0] must, therefore, never exceed a value of n/2 of the physical FIFO register array depth (in this case, fifo_depth 1 [4:0] must be less than or equal to sixteen).

The components of the module 250 allow the use of a single primary FIFO register array with logical FIFO arrays for entries 0 to (n/2)–1 and entries n/2–n. In the example shown in FIG. 5, n=32. Thus, data from agent 0 is written to one of the entries 0–15, using the write_pointer 0[4:0] signal, and data from agent 1 is written to one of the entries 16–31 using the write_pointer 1 [4:0] signal, multiplexed through the write address multiplexer 263.

The control 255 also provides control signals to other multiplexers in the architecture 200, including the multiplexers 220,221 and 240. These signals determine the configuration of the multiplexers to pass data from channel 0 or channel 1.

Figure 6:
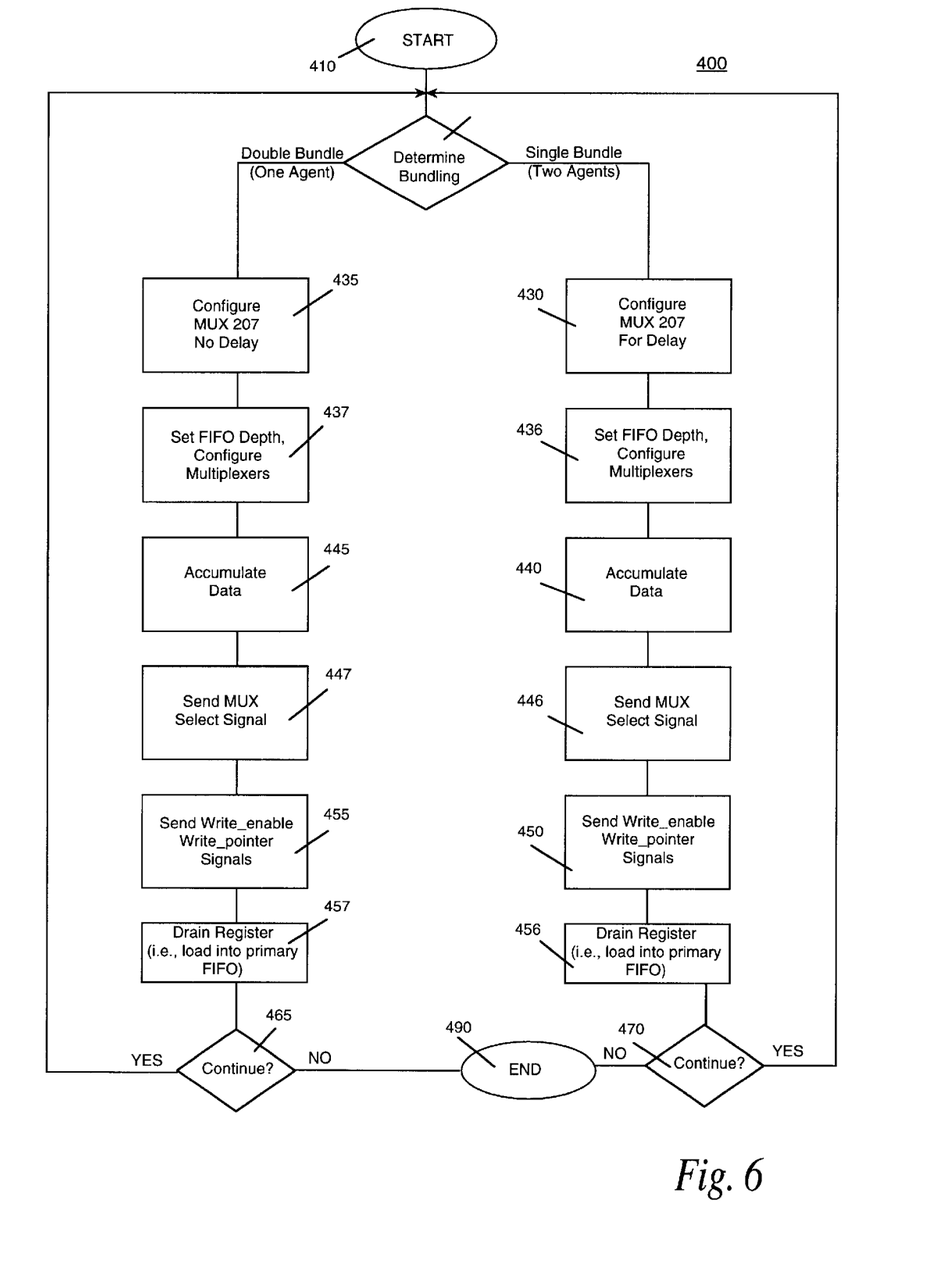
FIG. 6 is a flowchart illustrating a process executed on the architecture of FIGS. 3 and 5.

FIG. 6 is a flowchart illustrating a FIFO register array configuration process 400 executed on the architecture 200 shown in FIG. 3 and the control module 250 shown in FIG. 5. The process described will be limited to operation of the FIFO register array 230/231. A similar process would operate in parallel on any other FIFO register arrays, such as the FIFO register array 232/233, and their associated prestage components in the architecture 200. The process will be described assuming no data has been written to the FIFO register array 230/231. A similar process may be executed on the architecture 300 shown in FIG. 4.

In FIG. 6, the process begins at block 410. In block 420, the interface configuration control 255 determines whether the FIFO register array 230/231 will be configured as a single channel-depth register array or a double channel-depth array. The decision process shown in block 420 may be extended to other agent bundling configurations that are accommodated by the architecture 200.

In block 435 (double bundled channel configuration, agent 0), the control 255 configures the delay multiplexer 207 so that no delay occurs in writing data to the register 206. In block 437, the control 255 sends the fifo_depth 0[4:0] signal to the agent 0 FIFO control 251 to setup the control 251 for double depth operations. The fifo_depth 1 [4:0] is not required because of the bundled channel configuration. Accordingly, the control 255 controls the muxes 261,263 and 265 to only service agent 0. The control 255 also sends an agent control signal to the write enable multiplexer 265 and the write address multiplexer 263 to configure the multiplexers so that a write pointer in the FIFO register array 230/231 is selected from agent 0's FIFO control 251 to write data to the first available entry (in this case, entry 0).

In block 445, the registers 210 and 211 each accumulate 16 bits of data from their associated channels. Using the example architecture 200, the data are accumulated over two clock cycles. In block 447, the control 255 sends a mux_select signal 220 to the multiplexer 220 to configure the multiplexers 220 and 221 to transfer data from the registers 210 and 211 through the multiplexer 220 to the FIFO register array 230/231.

In block 455, the agent 0 FIFO control 251 sends a write_enable 0 signal through the write enable multiplexer 265 to configure the FIFO register array 230/231 to write data to an entry. The agent 0 FIFO control 251 also sends a write_pointer 0 [4:0] signal through the write pointer multiplexer 263 to indicate where (i.e., which address or entry) the write pointer in the FIFO register array 230/231 should write incoming data to.

In block 457, the 32 bits of data in the register 210 are written to the FIFO register array 230/231.

In block 465, the interface configuration control determines if the data writing operations should continue. If the operations are to end, the process moves to block 490 and ends. Otherwise, the process returns to block 420.

In block 420, if a single bundled channel configuration is selected, the process moves to block 430, and the interface configuration control 255 configures the delay multiplexer 207 to impose a one cycle delay on some of the data being written to the register 211.

To ensure that data from channel 0 is written to the correct location in the FIFO register array 230/231, the interface configuration control 255 sends the fifo_depth 0 [4:0] signal to the agent 0 FIFO control 251 and the fifo_depth 1 [4:0] to the agent 1 FIFO control 253, block 436, to indicate a single depth FIFO configuration (i.e., 16 bits for each of the fifo_depth signals, in this case). The control 255 also sends an agent control signal to the write enable multiplexer 265 and the write address multiplexer 263 to configure the multiplexers so that a write pointer in the FIFO register array 230/231 is selected to write data to the first available entry for the actively loading agent (in this case, entry 0 for agent 0 or entry 16 for agent 1).

In block 440, the registers 210 and 211 accumulate data. The register 210 accumulates 32 bits of data in four clock cycles. The register 211 may also accumulate 32 data bits during the same four clock cycles, in which case the register 211 is stalled for one cycle. (This is a worse case scenario, and data may not arrive at the registers 210 and 211 during the same clock cycles.) In particular, the first 8-bits for channel 0 load into the 1st position of the register 210 and the first 8 bits for channel 1 load into the delay register 206 (the multiplexer 207 is set to delay mode). In the next clock cycle, a second 8-bits for channel 0 load into the 2nd position of the register 210, the delay register 206 advances to the 1st position of the register 211, and a second 8-bits for channel 1 load into the 2nd position of the register 211. (The delay register 206 is now empty.) In the next clock cycle, a third 8-bits for channel 0 load into the 3rd position of the register 210, and a third 8-bits for channel 1 load into the 3rd position of the register 211. In the next (fourth) clock cycle, a fourth 8-bits for channel 0 load into the 4th position of the register 210, and a fourth 8-bits for channel 1 load into the 4th position of the register 211.

In block 446, the control 255 sends mux select signals to the appropriate multiplexers, and in block 450 the write enable and write pointer signals are sent. In block 456, the registers unload data (and refill during the same clock cycles). In particular, during one clock cycle, the register 210 loads into primary FIFO stage 203 (register array position 230), new first 8-bits for channel 0 load into the 1st position of the register 210, new first 8-bits for channel load into the delay register 206, and the register 211 holds its value. In the next clock cycle, the register 211 loads into the primary FIFO stage 204 (register array position 231), a new second 8-bits for channel 0 load into the 2nd position of the register 210, the delay register 206 advances to the 1st position of the register 211, and a new second 8-bits for channel 1 load into the 2nd position of the register 211. This process of loading and unloading the registers 210 and 211 then continues as before, block 470, until the end of processing, block 490.

In the architectures 200 (FIG. 3) and 300 (FIG. 4) discussed above, the number of prestages can also be extended to handle any round robin latency to load into the shared FIFO in any number of write-ported register arrays for the prestage and the primary stage. In the examples shown in FIGS. 3 and 4, four source channels are shown. If the efficiency calculations suggest this implementation, all four FIFOs could be collapsed into a four-deep FIFO with the same set of double prestage registers or prestage FIFOs previously described. If the incoming data width was 16-bits instead of 8-bits, then additional prestate registers could be added, or more write ports could be added to the primary register array FIFO. In addition, all four physical channels could be configurably bundled into a quad-bundled agent 0 or two double-bundled agents 0 and 2, or four single agents 0, 1, 2 and 3. Variable bundling can be extended to handle any number of physical channels bundled into an equal or smaller number of logical agents. In addition, the number of physical channels and the number of logical agents need not be only a power of 2. That is, configurations shown in FIGS. 3 and 4 may be applied to fit any number of physical channels and any number of logical agents when sending the data to the next stage.

Finally, if the primary stage register array has a limitation on depth based on technology, the configuration shown in FIGS. 3 and 4 can be increased in depth by adding additional primary stage register arrays and then ping-ponging between the two primary stages when receiving data and then ping-ponging between the two output read ports.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An reconfigurable first-in/first-out mechanism to support multiple channels in a bundled agent configuration, comprising:
   a coalescing prestage comprising:
      first registers, each of the first registers capable of holding X data bits, each of the first registers receiving data bits in increments of X/N, where N is an integer, and wherein each of the first registers coalesces the X/N data bits until X data bits are stored, and
      second registers, each of the second registers capable of holding at least X/N data bits, the second registers coupled to selected ones of the first registers, wherein the second registers store the at least X/N data bits to impose a delay in transferring the X/N data bits to the selected ones of first registers; and a bundled first-in-first out (FIFO) stage coupled to the coalescing prestage.

2. The mechanism of claim 1, the coalescing prestage further comprising a first multiplexer coupled between each of the selected ones of the first registers and one of the second registers, wherein the first multiplexer operates to select either an output of the one of the second registers and a data bit input of X/N data bits.

3. The mechanism of claim 1, the coalescing prestage further comprising second multiplexers, each of the second multiplexers coupled to an output of one or more of the first registers, wherein a second multiplexer selects an output from one of the coupled one or more first registers, the second multiplexer sending the output to the FIFO stage.

4. The mechanism of claim 3, wherein a number of the second multiplexers equals a number of the first registers.

5. The mechanism of claim 1, wherein a value of the delay varies from one clock cycle to N−1 clock cycles.

6. The mechanism of claim 1, wherein the coalescing prestage comprises one or more multi-ported register arrays, each of the one or more multi-ported register arrays coupled to multiple channels and having a data bandwidth equal to or greater than a data bandwidth of the multiple channels coupled thereto.

7. The mechanism of claim 6, wherein each of the one or more multi-ported register arrays comprises a data depth equal to a data capacity of the multiple channels coupled thereto.

8. The mechanism of claim 6, wherein each channel of the multiple channels has an independent write port in one of the one or more multi-ported register arrays.

9. The mechanism of claim 6, wherein the multiported register arrays each comprise multiple read ports.

10. The mechanism of claim 1, wherein the bundled first-in/first-out stage comprises a combined register stage, comprising one or more primary register arrays, each of the one or more primary register arrays having a plurality of logical register arrays.

11. The mechanism of claim 1, further comprising:
    an interface configuration control;
    a separate first agent control coupled to the interface configuration control, the first agent control providing first entry locations for writing data to and reading data from the bundled FIFO stage; and
    a separate second agent control coupled to the interface configuration control, and operating independently of the first agent control, the second agent control providing second entry locations for writing data to and reading data from the bundled FIFO stage.

12. A method for reconfiguring first-in/first-out registers to support multiple channels in bundled agent configurations, comprising:
    receiving data from one or more agents, each of the one or more agents providing the data on one of multiple channels;
    coalescing the received data wherein the coalescing, comprises:
        receiving the data from the one or more agents in increments of X/N data bits, wherein X represents a capacity of first registers and X/N represents a capacity of a channel, and
        storing one X/N increment of data bits in a second register to delay receipt of the one X/N increment of data bits by a first register; and
    writing the coalesced data to one of a plurality of bundled first-in/first-out register arrays.

13. The method of claim 12, wherein coalescing the received data further comprises multiplexing outputs from the first registers.

14. The method of claim 12, wherein the coalescing comprises storing the received data in one or more multi-ported register arrays.

15. The method of claim 12, wherein the multi-ported register arrays comprise independent write ports corresponding to each channel of the multiple channels, and further comprising, writing data from a specific channel using a specific independent write port.

16. The method of claim 12, wherein the multi-ported register arrays comprise multiple independent read ports, and further comprising reading data from the multi-ported register arrays using specific read ports.

17. The method of claim 12, wherein writing the coalesced data comprises writing the coalesced data to logical register arrays in each of the plurality of bundled first-in/first-out register arrays.

18. The method of claim 12, wherein the coalescing comprises bundling two or more channels to provide bundled data.

19. An apparatus that provides a reconfigurable first-in/first-out (FIFO) for multiple channels and multiple agents, comprising:
    a coalescing prestage, comprising:
        a plurality of multiple register sets, the multiple registers in each set servicing one or more agents, wherein the one or more agents provide data for loading into the multiple registers, and
        second register sets capable of storing X/N data bits, the second registers coupled to specified ones of the multiple register sets, wherein the second registers store the X/N data bits to impose a daily in unloading the specified register sets; and
        a plurality of selection device sets, each selection device set corresponding to one of the multiple register sets, wherein the selection device sets control unloading and loading of selected registers in the multiple register sets; and
    a primary FIFO storage coupled to the coalescing prestage, comprising a primary storage device having one or more logical storage areas, wherein data from each agent of the one or more agents is mapped to specified locations in the primary storage device.

20. The apparatus of claim 19, further comprising:
    an interface configuration control;
    a first agent control coupled to the interface configuration control, the first agent control providing first entry locations for writing data to and reading data from the primary storage device; and
    a second agent control coupled to the interface configuration control, the second agent control providing second entry locations for writing data to and reading data from the primary storage device.

* * * * *